United States Patent
Balaji et al.

(10) Patent No.: US 11,341,455 B2
(45) Date of Patent: May 24, 2022

(54) METHODS, SYSTEMS, ARTICLES OF MANUFACTURE, AND APPARATUS TO MONITOR THE AVAILABILITY OF PRODUCTS FOR PURCHASE

(71) Applicant: The Nielsen Company (US), LLC, New York, NY (US)

(72) Inventors: Kannan Balaji, Tampa, FL (US); Arun Ramaswamy, Tampa, FL (US)

(73) Assignee: NIELSEN CONSUMER LLC, New York, NY (US)

( * ) Notice: Subject to any disclaimer, the term of this patent is extended or adjusted under 35 U.S.C. 154(b) by 0 days.

(21) Appl. No.: 16/857,769

(22) Filed: Apr. 24, 2020

(65) Prior Publication Data
US 2021/0334737 A1   Oct. 28, 2021

(51) Int. Cl.
*G06Q 30/00* (2012.01)
*G06Q 10/08* (2012.01)
*G06F 16/23* (2019.01)
*G06Q 30/02* (2012.01)

(52) U.S. Cl.
CPC ....... *G06Q 10/087* (2013.01); *G06F 16/2379* (2019.01); *G06Q 30/0201* (2013.01); *G06Q 30/0227* (2013.01)

(58) Field of Classification Search
None
See application file for complete search history.

(56) References Cited

U.S. PATENT DOCUMENTS 5,056,019 A * 10/1991 Schultz ............... G06Q 20/20
                                                    235/380
6,757,362 B1    6/2004 Cooper et al.
(Continued)

FOREIGN PATENT DOCUMENTS

WO    WO-2005067438 A2 *  7/2005   ......... G06Q 10/0875
WO    WO-2006055667 A2 *  5/2006   ........... G06Q 10/087

OTHER PUBLICATIONS

Frontoni, Emanuele, et al. "Design and test of a real-time shelf out-of-stock detector system." Microsystem Technologies 24.3 (2018): 1369-1377. (Year: 2018).*

(Continued)

*Primary Examiner* — Michael Bekerman
(74) *Attorney, Agent, or Firm* — Hanley, Flight & Zimmerman, LLC (57) ABSTRACT

Methods, systems, articles of manufacture, and apparatus to monitor the availability of products for purchase are disclosed. An apparatus includes a communications interface to receive market data from data collectors, the market data including stock status data indicative of different stock statuses for a product in different retail establishments. The apparatus further includes a reward profile analyzer reduce error in collection of the stock status data by: generating a reward profile for the market data, the reward profile to define different reward levels for different types of the stock statuses indicated by the stock status data; determining a distribution of rewards among the different data collectors based on the reward profile and different portions of the market data provided by corresponding ones of the different data collectors; and providing the rewards to the different data collectors based on the distribution.

20 Claims, 5 Drawing Sheets

(56) References Cited

U.S. PATENT DOCUMENTS

| | | | | |
|---|---|---|---|---|
| 7,945,470 B1* | 5/2011 | Cohen | ................... | G06Q 10/06 705/7.13 |
| 8,121,888 B1* | 2/2012 | Cohen | ............. | G06Q 10/06398 705/7.38 |
| 9,153,089 B1* | 10/2015 | Hewett | ................ | G06Q 20/322 |
| 9,172,747 B2 | 10/2015 | Walters et al. | | |
| 9,367,831 B1* | 6/2016 | Besehanic | ............ | G06Q 10/087 |
| 9,471,893 B2* | 10/2016 | Briet | ...................... | G06Q 40/12 |
| 2005/0154629 A1* | 7/2005 | Matsuda | ............ | G06Q 30/0204 705/7.33 |
| 2005/0209934 A1* | 9/2005 | Irby | ..................... | G06Q 10/087 705/28 |
| 2006/0164247 A1* | 7/2006 | Overhultz | ............... | A47F 10/02 340/572.1 |
| 2009/0319399 A1* | 12/2009 | Resta | ..................... | G06Q 10/00 705/28 |
| 2010/0138281 A1* | 6/2010 | Zhang | ................. | G06Q 20/203 705/28 |
| 2014/0278850 A1* | 9/2014 | Boccuzzi, Jr | ...... | G06Q 30/0208 705/14.11 |
| 2015/0154624 A1* | 6/2015 | Torabi | .................... | H04L 67/22 705/14.16 |
| 2016/0092828 A1* | 3/2016 | Sofsky | ................. | G06Q 10/087 705/26.81 |
| 2018/0182013 A1* | 6/2018 | Haubold | ............ | G06Q 30/0641 |
| 2019/0235887 A1 | 8/2019 | Hemaraj et al. | | |
| 2020/0118064 A1* | 4/2020 | Perrella | ................. | H04W 4/021 |
| 2021/0287237 A1* | 9/2021 | Holman | ............. | G06Q 30/0204 |
| 2022/0044150 A1 | 2/2022 | Balaji et al. | | |

OTHER PUBLICATIONS

Rosado, Luís, et al. "Supervised learning for Out-of-Stock detection in panoramas of retail shelves." 2016 IEEE International Conference on Imaging Systems and Techniques (IST). IEEE, 2016. (Year: 2016).*

Papakiriakopoulos, Dimitrios A. "Automatic detection of out-of-shelf products in the retail sector supply chain." International Journal of Retail & Distribution Management (2006). (Year: 2006).*

* cited by examiner

METHODS, SYSTEMS, ARTICLES OF MANUFACTURE, AND APPARATUS TO MONITOR THE AVAILABILITY OF PRODUCTS FOR PURCHASE

FIELD OF THE DISCLOSURE

This disclosure relates generally to the technical field of market research, and, more particularly, to methods, systems, articles of manufacture, and apparatus to monitor the availability of products for purchase.

BACKGROUND

Manufacturers, suppliers, distributors, and/or other product providers are often interested in maintaining the availability of their products for purchase by consumers at retail establishments. Accordingly, such product providers may implement, initiate, and/or participate in market research systems that enable the collection of data that is indicative of product availability. Collecting and processing data indicative of such information, especially when the data is obtained from many retail establishments and/or many consumers (e.g., numbering in the thousands or more), are just some of the technological challenges that must be overcome in the field of market research.

The figures are not to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Whether products are available for purchase in a particular market can be confirmed by tracking the inventory and/or the stock status levels of the products in retail establishments within the particular market of interest. Additionally or alternatively, product availability (or the lack thereof) may be inferred by tracking and/or identifying circumstances when a brand loyal consumer purchases alternate brands and/or alternate products that deviate from the products the consumer regularly purchases. Methods, systems, apparatus, and articles of manufacture to monitor the availability of products by monitoring stock statuses of products in stores and/or by tracking deviations in purchasing behavior of brand loyal consumers are disclosed herein.

There are a variety of technologies and associated approaches that may be employed to collect data indicative of the inventory and/or stock statuses of particular products in retail establishments. Frequently, such approaches involve one or more individuals (e.g., auditors, consumers, etc.) physically entering selected retail establishments to observe and record the amount, placement, display, and/or arrangement of target products of interest within the store. Such information may be compared to the capacity of an allotted space for the particular target products to determine the stock status. As used herein, the stock status of a particular product may range from an out-of-stock status (when none of the product is available and/or on display within the allotted space) to a fully stocked status (when the allotted space is filled to capacity with the particular product). In some examples, a partially stocked status indicates at least some product is available and/or on display, but the amount is less than the capacity of the allotted space for the product. In some examples, different intermediate stock status levels may be defined for multiple different gradations (e.g., threshold values) of a partially stocked product (e.g., near 0% stocked (e.g., out-of-stock), near 25% stocked, near 50% stocked, near 75% stocked, near 100% stocked (e.g., fully stocked), over 100% stocked (e.g., over stocked), etc.). In some examples, the stock status of a product may include an overstock status in which the retail establishment has more of the product available and/or on display than the capacity of the allotted space for the product.

In some examples, the stock status of a particular product may be determined directly by the individual making the observations within an associated retail establishment, which is then reported to a data collection facility (e.g., a server) of a market research entity. In other examples, such individuals may record the number of products (and/or any other suitable metric indicative of the amount of the product available) that is then reported to the market research entity. In such examples, the market research entity may then analyze the data to determine and/or appropriately categorize the data to a particular stock status by comparing the reported data to independently obtained information (e.g., from the retail establishment) indicative of the capacity of allotted space for the product.

While having the stock statuses of a product at multiple different stores can be beneficial information to product providers (e.g., manufacturers, suppliers, distributors, etc.), some types of stock statuses may be more important than others to such product providers. For instance, in some examples where a product provider is primarily interested in ensuring that consumers have access to its products for purchase, it is more important for the product provider to be aware of an out-of-stock status than a partially stocked status because an out-of-stock status indicates that no products are available to consumers for purchase. By similar reasoning, in such examples, it is likely to be more important for a product provider to be aware of a partially stocked status than a fully stocked status. In other instances where, for example, a product provider is organizing a mark-down and/or promotional discounts to get rid of excess stock, an over stock status may be more important than a fully stocked status, which may be more important than a partially stocked status, which may be more important than an out-of-stock status.

Examples disclosed herein implement a system for the collection and/or monitoring of stock status data that provides rewards to the data collectors commensurate with the insights gained (e.g., the relative importance of the stock status) from the stock status data reported by the data collectors. That is, where stock statuses associated with relatively low stock levels are of particular importance, greater rewards are provided to the data collectors corresponding to reporting data indicative of relatively low stock levels (e.g., an out-of-stock status), and smaller rewards are provided to the data collectors corresponding to reporting data indicative of higher stock levels (e.g., a fully stocked status). Providing rewards in this manner creates incentives in the system to facilitate and/or promote the collection and reporting of data that is of particular importance to product providers and/or market research entities. Stated differently, while the data collectors are typically chartered with the responsibility to collect all information for all products of interest and their corresponding stock status type, such data collectors may have a limited ability to focus on the many different types of products and/or the many different types of stock status. As such, examples disclosed herein reduce and/or otherwise eliminate the discretionary choices of the data collectors when performing their data collection activities. Instead, the data collectors are guided with a degree of focus that is commensurate with the data collection objectives of the market research entity. Additionally or alternatively, in some examples, rewards may be provided to retail establishments associated with particular stock statuses indicating desired levels of inventory (e.g., greater rewards for a fully stocked product than a partially stocked product or an out-of-stock product).

As mentioned above, examples disclosed herein infer product availability by tracking and/or monitoring purchasing behavior data indicative of the nature of purchases made by consumers (e.g., the types and/or brands of products purchased, the frequency of their purchases, the price paid, etc.). In particular, in some examples, the purchasing behavior data includes, among other things, an identification of products purchased by consumers. By collecting, storing, and analyzing this information over time, it is possible to identify how consistently consumers purchase particular products and/or brands over alternate and/or competing products and/or brands. The degree to which a consumer is consistent in purchasing the same type of product and/or brand is indicative of the degree of product/brand loyalty of the consumer for the particular product and/or brand. There may be situations where consumers who normally buy a particular product or brand (e.g., indicative of product/brand loyalty) are found to deviate from their normal purchasing behavior and buy an alternate product and/or brand. One potential reason for the deviation from regular purchasing behavior may be that the usual product or brand the consumers purchase was not available at the time. Thus, such deviations in purchasing behavior of product/brand loyal consumers may be used as an indirect measure of the availability of products. As described above with the examples based on stock status data, in some examples disclosed herein, greater rewards may be distributed to data collectors reporting purchasing behavior data indicative of deviations to product/brand loyalty purchases than to data collectors providing data indicative of purchases made consistent with a consumer's product/brand loyalty. Additionally or alternatively, rewards may be distributed to different retail establishments in different amounts depending on whether the purchasing behavior data of consumers shopping at the retail establishment indicate regular behavior of the consumers or deviations to their regular behavior. In some examples, the difference in rewards provided to different data collectors and/or retail establishments may be defined commensurate to the nature of the insights gained from the reported data and/or the degree of importance of the information conveyed by the data to a product provider and/or market research entity seeking such data as part of a market research study.

In some examples, what is important to product providers and/or market research entities may change over time in response to an analysis of data that has already been collected. Accordingly, in some examples, the reward profile used to define the distribution of rewards between different data collectors and/or different retail establishments may be updated and/or changed over time to either focus on different items of interest and/or to confirm/validate observations and/or insights gained from the previous collection of data.

Figure 1:
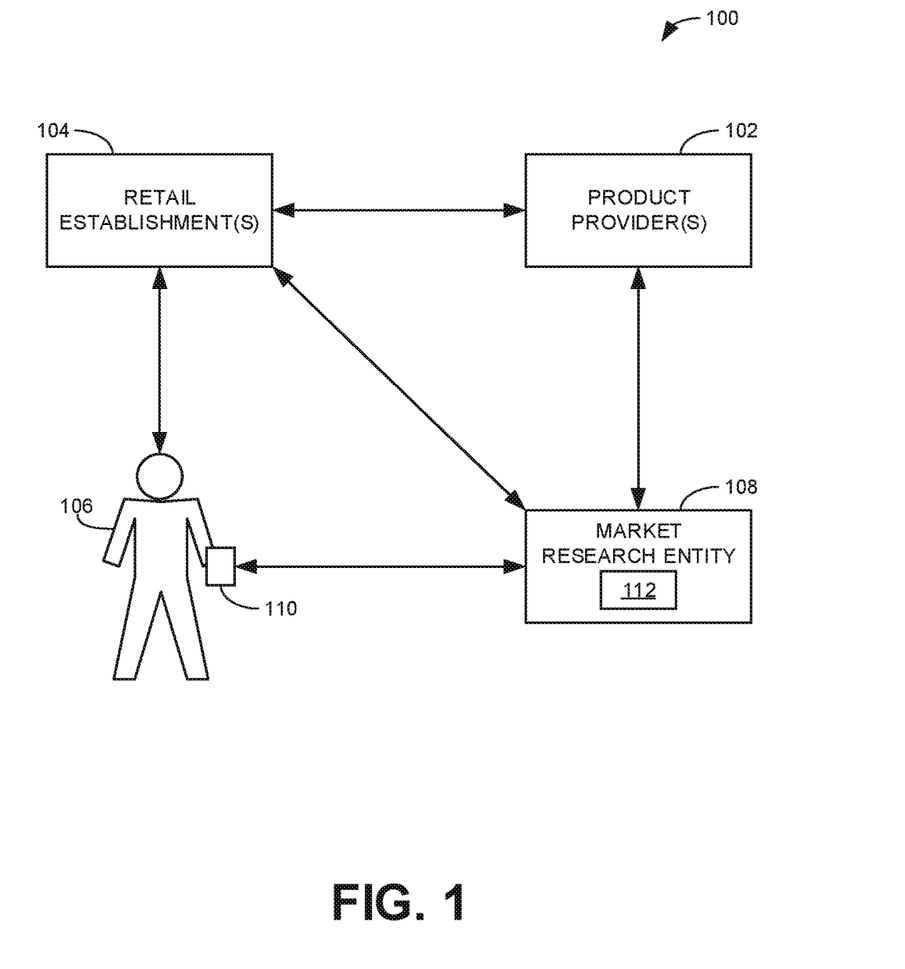
FIG. 1 is a schematic illustration of an example environment in which teachings disclosed herein may be implemented.

FIG. 1 is a schematic illustration of an example system 100 within which the teachings disclosed herein may be implemented. The example system 100 of FIG. 1 includes one or more product provider(s) 102 that provide products to one or more retail establishment(s) 104 for sale. As used herein, a product provider is an entity that manufactures, produces, distributes, supplies, and/or otherwise provides products that may be purchased by consumers. As used herein, a retail establishment is an entity that is at the consumer-facing end of the product supply chain to interact directly with consumers purchasing products provided by the product providers 102. Although the product provider(s) 102 are shown as distinct entities in the illustrated example, in some instances, a product provider 102 may also be a retail establishment. In some examples, the retail establishment(s) 104 may be a brick-and-mortar store that permits consumers into the premises to view and purchase goods. Additionally or alternatively, the retail establishment(s) 104 may sell their products via the Internet with their inventories stored at a location that is not open to physical access by consumers. As such, examples disclosed herein prevent the data collectors from applying data collection activities in a habitual and/or otherwise unguided manner, thereby improving the accuracy of the data collection process.

In the illustrated example of FIG. 1, individuals 106 may make visual observations of the inventory and/or stock status of particular products maintained by the retail establishment(s) 104 and report their findings to a market research entity 108. Additionally or alternatively, the individuals 106 may report data indicative of the purchasing behavior of consumers at particular ones of the retail establishment(s) 104 to the market research entity 108. In some examples, the market research entity 108 performs market research at the request of ones of the product provider(s) 102 and/or the retail establishment(s) 104. In some examples, the market research entity 108 corresponds to one of the product provider(s) 102 and/or the retail establishment(s) 104. In other examples, as represented in FIG. 1, the market research entity 108 is an independent third party (e.g., The Nielsen Company (US), LLC). In some examples, the particular retail establishment(s) 104 for which data (e.g., stock status data and/or purchasing behavior data) is collected are selected from a pool of retail establishments 104 that have agreed to participate in research studies by the market research entity 108. In some such examples, part of the process for a retail establishment 104 registering as a participant in the research studies may include providing information about the retail establishment such as the products carried and the allotted space for such products. In this manner, the market research entity 108 is able to determine which retail establishments 104 carry a particular product of interest and also the allotted space for such products so that the amount of product currently in stock can be compared to the allotted space to determine, categorize, and/or label the stock status of the particular product at the time the observations are made.

In some examples, the individuals 106 are managers, employees, and/or other personnel of the retail establishment(s) 104. As such, the individuals may have access to the inventory of the retail establishment 104 regardless of whether the establishment is a brick-and-mortar store physically accessible to consumers. In some examples, the individuals 106 are employees and/or other personnel associated with ones of the product provider(s) 102. In some examples, the individuals 106 are auditors sent by the market research entity 108 to audit the retail establishment(s) 104. In some examples, the individuals 106 are consumers that may or may not be enrolled as a panelist in a market research panel maintained by the market research entity 108. For purposes of brevity, the individuals 106 that collect and/or report stock status data and/or purchasing behavior data to the market research entity 108 are referred to herein as data collectors.

In some examples, the nature of the data collected by data collectors 106 and/or how the data is collected can affect the way in which the data is reported to the market research entity. For instance, in some examples, if the data to be collected is stock status data indicative of the stock levels of particular products, the data collector 106 is provided with a reporting device 110 that is portable to be carried into the retail establishment(s) 104 to assist in a visual inspection of the shelves and/or other product displays. In some examples, the reporting device 110 is capable of communicating with the market research entity 108 via a network (e.g., the Internet). In some such examples, the market research entity 108 may transmit instructions to the data collector 106 via the reporting device 110 identifying what retail establishment(s) 104 to visit and/or what products the data collector 106 is to look for. In some examples, the data collectors 106 may enter their observations directly onto the reporting device 110 (e.g., via a keyboard and/or touchscreen) and/or use a camera of the reporting device to capture an image of the product in the retail establishment 104 being audited. Once the data collector 106 has entered or otherwise captured the relevant data, the reporting device 110 may transmit the collected data back to the market research entity 108 while still at the retail establishment 104. In some examples, the data collector 106 may visit multiple different retail establishments 104 and collect relevant data from each establishment before the collected data is transmitted to the market research entity 108.

In some examples, the reporting device 110 is a device dedicated to the collection of market research data (e.g., stock status data and/or purchasing behavior data). In other examples, the reporting device 110 may be a multi-function computing device (e.g., a smartphone of a consumer) that includes an application to communicate with the market research entity 108. In some examples, the reporting device 110 may not be portable. For instance, the reporting device 110 may be a desktop computer maintained in the retail establishment 104 (e.g., if the data collector 106 is an employee of the retail establishment). In some examples, the collection of observations about stock statuses of products may be substantially automated through the use of drones and/or robots that move through aisles and/or other product arrangements of a retail establishment 104.

In examples where the data to be collected is purchasing behavior data indicative of the types of products purchased by consumers, the reporting device 110 may be communicatively coupled to registers in the retail establishment to track all purchases made by consumers. In other examples, the reporting device 110 may include a barcode scanner to enable a data collector 106 (e.g., a consumer) to scan purchased product(s) and transmit the same to the market research entity 108. In some such examples, the reporting device 110 may not be carried into the retail establishment 104 but used after a consumer (as the data collector 106) returns home with the purchased product(s). In some examples, a consumer data collector 106 may capture a photograph of a receipt from the retail establishment 104 using the reporting device 110 and transmit the photograph to the market research entity 108 for processing. In some examples, the reporting device 110 may collect purchasing behavior data from one or more Internet of Things (IoT) devices in a consumer's home that are capable of tracking product purchases of the consumer.

Regardless of the particular way in which the data is collected or the type of data collector 106 doing the collecting (whether manager, employee, auditor, consumer, etc.), once the data is collected, the data is transmitted to the market research entity 108. More particularly, in some examples, the data from multiple data collectors 106 is aggregated and processed by a data processing server 112 of the market research entity 108. In some examples, the data processing server 112 generates reports based on findings and/or insights obtained from an analysis of the collected data. In some examples, such reports may be provided to the product provider(s) 102 and/or the retail establishment(s) 104. In some instances, the insights gained from an analysis of collected data may reveal information indicating that additional data and/or analysis may be beneficial. Accordingly, in some examples, further data may be sought to clarify and/or confirm initial findings from the previously analyzed data.

In some examples, to facilitate and/or incentivize the collection of data that provides the greatest insight gains and/or relates to the most important information in a particular research study, the market research entity 108 provides rewards to the data collectors 106 and/or the retail establishments 104 from which such data was obtained. For instance, if a particular research study is primarily interested in identifying markets where product availability for a particular product is low, the most important information may be when the stock status of the particular product is relatively low (e.g., out-of-stock) with a fully-stocked status being less important. Accordingly, in some such examples, data collectors 106 that report out-of-stock statuses for products are provided greater rewards than for reporting fully-stocked statuses for products. In some examples, the data processing server 112 of the market research entity 108 determines how to distribute rewards between multiple different data collectors 106 based on a reward profile defined in accordance with the particular information of interest in the particular research study. As mentioned above, in some examples, insights can be gained from the analysis of initially collected data that may suggest additional research based on the additional collection of data (e.g., to confirm initial findings and/or to investigate different aspects of market data). In some such examples, the data processing server 112 may update or revise the reward profile so that collected data that specifically addresses the aspects of particular importance to a market research study are favored and rewarded more highly than other aspects. In some examples, the particular aspects to be investigated further may be determined automatically from an analysis of the previously collected data. In other examples, the particular aspects to be investigated further may be driven by the product provider 102 and/or retail establishment 104 that is working with the market research entity 108 to implement the study.

Figure 2:
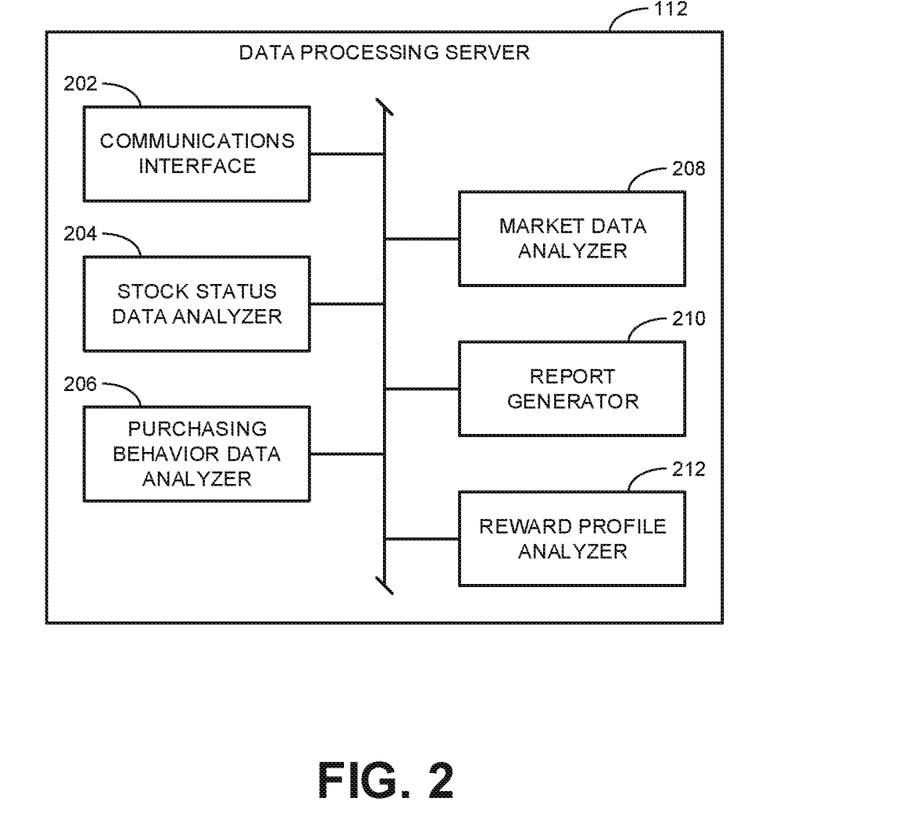
FIG. 2 is a block diagram of an example implementation of the example data processing server of FIG. 1.

FIG. 2 is a block diagram of an example implementation of the example data processing server 112 of FIG. 1. The example data processing server 112 includes an example communications interface 202, an example stock status data analyzer 204, an example purchasing behavior data analyzer 206, an example market data analyzer 208, an example report generator 210, and an example reward profile analyzer 212.

The example communications interface 202 enables communications between the data processing server 112 and one or more of the product provider(s) 102, the retail establishment(s) 104, and/or the reporting devices 110. For instance, in some examples, the communications interface transmits instructions for the data collectors 106 to the reporting devices 110 to identify particular retail establishment(s) 104 and/or particular products in such establishments for which stock status data and/or purchasing behavior data is to be collected for particular market research studies. In some examples, the particular retail establishment(s) 104 and/or the particular products to be studied may be selected based on previous communications received from the product provider(s) 102 and/or the retail establishment(s) 104. Further, the example communications interface 202 may receive the requested stock status data and/or purchasing behavior data transmitted from the reporting devices 110 once collected.

The example stock status data analyzer 204 analyzes collected stock status data to determine the stock status for a particular product at a particular retail establishment 104 and to associate the stock status with the particular retail establishment. In some examples, the stock status is categorized according to one of a plurality of stock status levels corresponding to the amount of product in stock relative to the capacity of an allotted space for the product within the particular retail establishment 104. In some examples, the stock status is expressed as a percentage of a fully stocked allotted space for the product in the retail establishment 104. For example, an out-of-stock status corresponds to a stock status of 0%, whereas a fully-stocked status corresponds to a stock status of 100%. In some such examples, one or more intermediate or partially stock statuses may be defined for different percentages between 0% and 100%. In some examples, an overstock status may be defined as a percentage over 100%.

In some examples, a data collector 106 may directly determine the stock status and report the same via the reporting device 110. In some such examples, the stock status data analyzer 204 merely associates the stock status with the corresponding retail establishment 104 for subsequent analysis. In other examples, a data collector 106 may enter or otherwise capture information indicative of the amount of the product that is available at a particular retail establishment 104 without specifically indicating the stock status (e.g., the percentage relative to the fully-stocked status). In some such examples, the stock status data analyzer 204 determines the stock status by comparing the reported data to the capacity of the allotted space for the product, which may be previously obtained from the retail establishment 104. Once the stock status data analyzer 204 determines the stock status in such examples, the stock status data analyzer 204 associates the stock status with the retail establishment 104 for further analysis.

The example purchasing behavior data analyzer 206 analyzes collected purchasing behavior data to determine product purchasing deviations for particular product(s) and/or particular brands. As used herein, a product purchasing deviation means a consumer purchased an alternate product and/or brand from the regular product(s) and/or brand(s) the consumer usually buys. In other words, a purchasing deviation occurs when a consumer makes a purchase that is inconsistent with the product/brand loyalty the consumer has indicated based on an analysis of past purchasing behavior over time. Accordingly, in some examples, the purchasing behavior data analyzer 206 tracks the purchasing behavior data for consumers over time to identify trends indicative of product/brand loyalty and then identifies when the data indicates a deviation from such trends. Such deviations may be indicative of the unavailability of the particular product(s) and/or brand(s) the consumers usually purchase. Accordingly, in some examples, when a product purchasing deviation is identified, the example purchasing behavior data analyzer 206 associates the deviation with the particular product(s) and/or brand(s) that the consumer usually purchases (e.g., if there wasn't a deviation).

The example market data analyzer 208 analyzes the collected stock status data and/or the purchasing behavior data (collectively referred to herein as market data) to identify patterns, trends, and/or other insights indicative of the circumstances of the availability of particular product(s) for which the data was collected. In some examples, data is collected from numerous data collectors 106 reporting data associated with numerous retail establishment(s). This can result in large amounts of data that need to be processed and/or analyzed relatively quickly to provide reliable and up to date results of the current situation of particular markets of interest to the product provider(s) 102 and/or the retail establishment(s) 104. The need to process large amounts of data in relatively short time periods to produce accurate and timely marketing statistics are some of the technological challenges in the technical field of market research that rely on network communications between many different devices to enable the efficient and accurate collection of the data and also rely on efficient computer processors to analyze the data to generate reliable and accurate statistics in a constantly changing marketplace. The nature and amount of the data collected and the speed at which such data is collected and processed cannot reasonably be completed manually by humans, but requires technological solutions.

In some situations, the example market data analyzer 208 may identify some of the collected data as being of particular significance to insights gained about product availability and/or other market factors as compared with the rest of the collected data. In some examples, the market data analyzer 208 determines that additional data may need to be collected to confirm and/or verify the particular insights gained from the initially collected data. In some such examples, the market data analyzer 208 may identify particular retail establishment(s) 104 and/or particular data collectors 106 from which the additional data is to be collected. In some examples, the identified retail establishment(s) 104 and/or data collectors 106 are the same as involved in the previous data collection (e.g., to obtain a second set of datapoints at a later point in time relative to the initial data collection). Additionally or alternatively, in some examples, the retail establishment(s) 104 and/or particular data collectors 106 identified for the collection of additional data may be different than those involved in the initial data collection (e.g., to expand the pool of sample data from which data is collected to ensure statistical significance to the insights being identified).

As a specific example, assume that data collectors 106 provide an initial set of data associated with twenty different retail establishment(s) 104 indicative of the stock status of a particular product in the retail establishment(s) 104. In this example, an analysis of the initial data set by the market data analyzer 208 reveals that 90% of the retail establishments 104 in the relevant market are nearly or completely out-of-stock for the particular product. In some such examples, the market data analyzer 208 determines that stock status data from additional retail establishments 104 is needed to verify this observation. Accordingly, in some examples, the market data analyzer 208 identifies additional retail establishments 104 within the relevant market to be assessed for the stock status of the particular product of interest and sends (via the communications interface 202) instructions to the data collectors 106 to obtained the needed stock status data. In some examples, the market data analyzer 208 identifies the particular retail establishments selected for the subsequent data collection in any suitable matter from a pool of establishments that have agreed to participate in research studies. For instance, the retail establishments 104 may be selected through random sampling, stratified sampling, and/or in any other way. Once the stock status data for these additional retail establishments 104 has been collected, the example market data analyzer 208 analyzes the additional data to confirm the initial finding that the product of interest is out-of-stock in 90% of the retail establishments 104 within the relevant market. In some examples, if the additional data is insufficient to confirm the initial findings with an adequate statistical confidence, the example market data analyzer 208 may identify further retail establishments 104 to send data collectors 106 to collect further stock status data.

If the amount of data collected confirms the initial insight with statistical confidence, the example market data analyzer 208 may provide the results to the example report generator 210 to generate a report. The report may be provided (e.g., transmitted via the communications interface 202) to the product provider(s) 102 and/or the retail establishment(s) 104 to use as appropriate (e.g., to arrange for the replenishment of stock of the low availability product). In some examples, the results of the analysis of the market data analyzer 208 after each phase of data collection are provided to the report generator 210 to generate interim reports provided to the product provider(s) 102 and/or the retail establishment(s) 104. In some examples, the collection of additional data may be determined automatically by the market data analyzer 208 as outlined above. Additionally or alternatively, the collection of additional data may be driven by feedback and/or requests for additional insights from the product provider(s) 102 and/or the retail establishment(s) 104 after having reviewed a previous report generated by the report generator 210.

The example reward profile analyzer 212 generates and analyzes reward profiles that define the distribution of rewards to data collectors 106 and/or retail establishment(s) 104 based on the nature of information indicated by the data collected from the data collectors 106 and/or retail establishment(s) 104. As mentioned above, in some situations, particular types of data may provide greater insights and/or be more critical to the operations of the product provider(s) 102 and/or the retail establishment(s) 104 than other types of data. Thus, in some examples, the reward profiles are defined so that greater rewards are provided for the collection and reporting of the data that is of particular significance to the insights gained with smaller rewards provided for the other data. In some examples, the rewards may be points that may be redeemed for money, goods, services, and/or any other incentivizing reward. In some examples, the rewards are money, goods, and/or services without the designation of a corresponding point value.

In some examples, there may be a fixed number of rewards (e.g., points, dollars, etc.) to distribute. As such, in some examples, the reward profile analyzer 212 determines the particular reward profile used to distribute the rewards after the market data analyzer 208 has analyzed the collected data to determine how the data is categorized or labelled. As a specific example, assume that the product provider(s) 102 and/or the retail establishment(s) 104 are interested in identifying and responding to low levels of availability of a particular product in a particular market based on the stock status levels of the product. In such a situation, the most important data may be when the product is out-of-stock (or nearly so) in a particular retail establishment 104, whereas information about retail establishments 104 that are fully stocked with the product is less important. Further assume that 20 retail establishment(s) 104 are identified to be included in the study with the stock status for a particular product in these retail establishments 104 is collected with the following outcome: 5 retail establishments 104 are determined to be nearly out-of-stock, 4 retail establishments 104 are determined to be nearly 25% stocked, 2 retail establishments 104 are determined to be nearly 50% stocked, 4 retail establishments 104 are determined to be nearly 75% stocked, and 5retail establishments 104 are determined to be nearly 100% stocked (e.g., fully stocked). Finally, assume that there is a total of 1000 points to be rewarded to the data collectors 106 and/or retail establishment(s) 104 providing the stock status data.

Based on the stock statuses determined for each of the 20 retail establishments 104 and the total number of points available in the above example, the reward profile analyzer 212 may generate a recommended reward profile that defines the distribution of the rewards in a manner that rewards the lower stock status levels more than the higher stock levels. One example reward profile may assign points for the different stock statuses as follows: (1) nearly out-of-stock—100 points; (2) nearly 25% stocked—75 points; (3) nearly 50% stocked—50 points; (4) nearly 75% stocked—25 points; and (5) nearly fully stocked—0 points. Multiplying the points for each stock status level by the number of retail establishments associated with each stock status level noted above results in 1000 points, thereby defining the distribution of all available points. In some examples, the reward profile analyzer 212 may generate multiple different possible reward profiles with differing distributions of the points. For instance, a second alternative reward profile may be defined as follows: (1) nearly out-of-stock—120 points; (2) nearly 25% stocked—75 points; (3) nearly 50% stocked—50 points; (4) nearly 75% stocked—0 points; and (5) nearly fully stocked—0 points. In this second example, the number of points for the nearly out-of-stock retail establishments is higher than in the previous example but offset by the points for nearly 75% stocked retail establishments being reduced to 0. As a result, the total number of points distributed in the alternative reward profile is still 1000 points. In some examples, the different possible reward profiles may be provided to a system user to select a particular reward profile to be used to distribute rewards. In other examples, the reward profile analyzer 212 may automatically select a suitable reward profile and distribute the rewards accordingly.

While the reward profile analyzer 212 may determine a suitable reward profile after data has been collected and analyzed as described above, in some examples, an initial reward profile may be defined before data has been collected to incentivize the collection. In some examples, such reward profiles may be defined to distribute a maximum number of rewards (e.g., points) that is less than the total number of points available for distribution. For instance, in the above example, a pre-set reward profile may define 50 points for a nearly out-of-stock retail establishment and fewer points for other stock status levels. In such an example, the full 1000 points would be distributed only if all 20 retail establishments 104 were found to be out-of-stock. In other examples, a reward profile may be defined independent of a total number of points available for distribution. In some examples, an initial reward profile may be a default reward profile that provides the same amount of points regardless of the stock status. For example, 5 points may be rewarded for reporting data indicative of any stock status level. In some examples, the initial or default reward profile rewards no points for any data. In some examples, in some examples, the reward profile analyzer 212 may determine a particular reward profile for additional data to be collected based on the analysis of previously collected data. That is, in some examples, the reward profile analyzer 212 may update and/or revise the initial or default reward profile (that may provide no rewards or at least evenly distributed rewards) to define an uneven distribution of rewards that favors the collection of additional data corresponding to important insights gained through the analysis of the previously collected data.

While an example manner of implementing the data processing server 112 of FIG. 1 is illustrated in FIG. 2, one or more of the elements, processes and/or devices illustrated in FIG. 2 may be combined, divided, re-arranged, omitted, eliminated and/or implemented in any other way. Further, the example communications interface 202, the example stock status data analyzer 204, the example purchasing behavior data analyzer 206, the example market data analyzer 208, the example report generator 210, the example reward profile analyzer 212, and/or, more generally, the example data processing server 112 of FIG. 1 may be implemented by hardware, software, firmware and/or any combination of hardware, software and/or firmware. Thus, for example, any of the example communications interface 202, the example stock status data analyzer 204, the example purchasing behavior data analyzer 206, the example market data analyzer 208, the example report generator 210, the example reward profile analyzer 212, and/or, more generally, the example data processing server 112 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communications interface 202, the example stock status data analyzer 204, the example purchasing behavior data analyzer 206, the example market data analyzer 208, the example report generator 210, and/or the example reward profile analyzer 212 is/are hereby expressly defined to include a non-transitory computer readable storage device or storage disk such as a memory, a digital versatile disk (DVD), a compact disk (CD), a Blu-ray disk, etc. including the software and/or firmware. Further still, the example data processing server 112 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
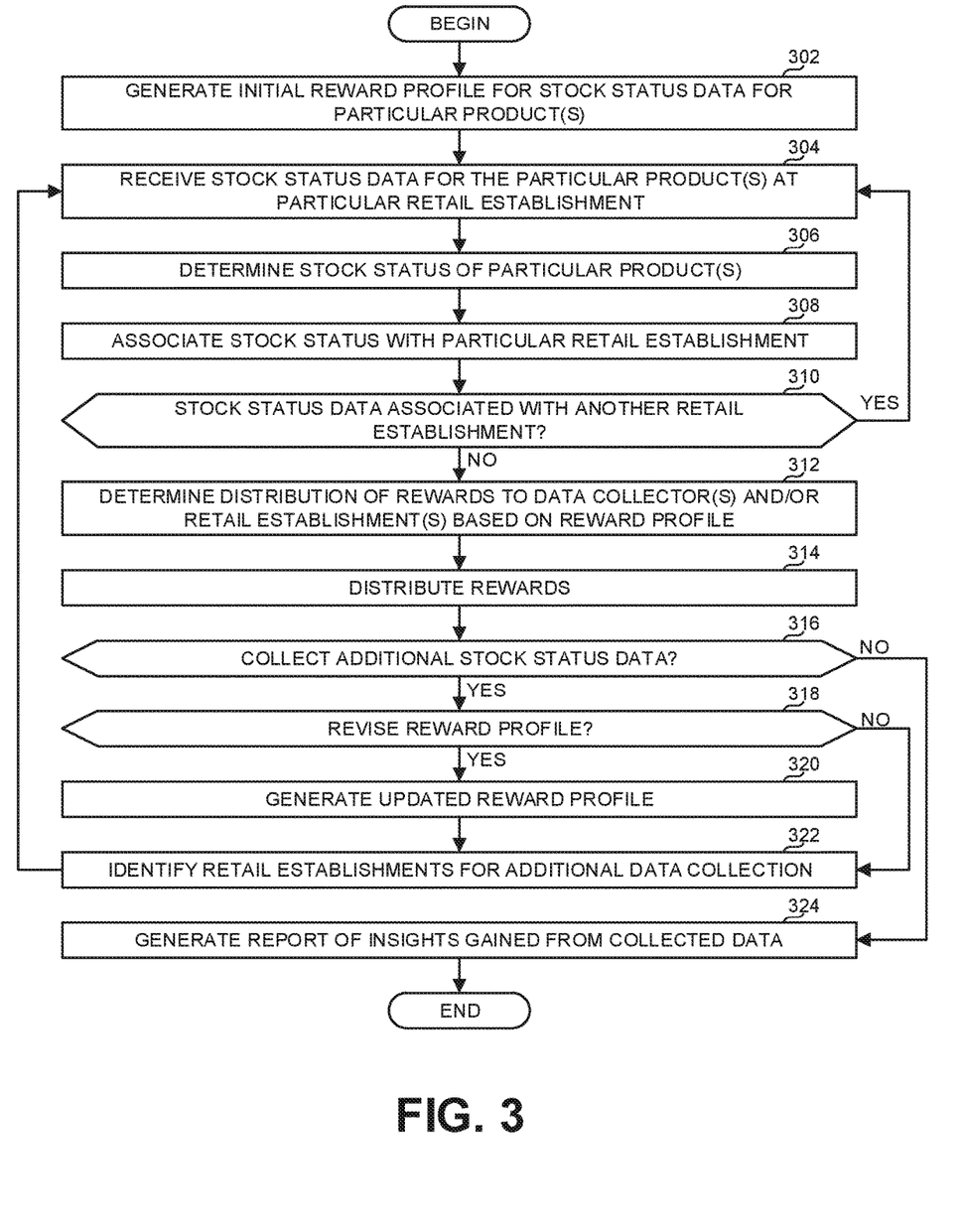
FIGS. 3 and 4 are flowcharts representative of example machine readable instructions that may be executed to implement the example data processing server of FIGS. 1 and/or 2.
Figure 4:
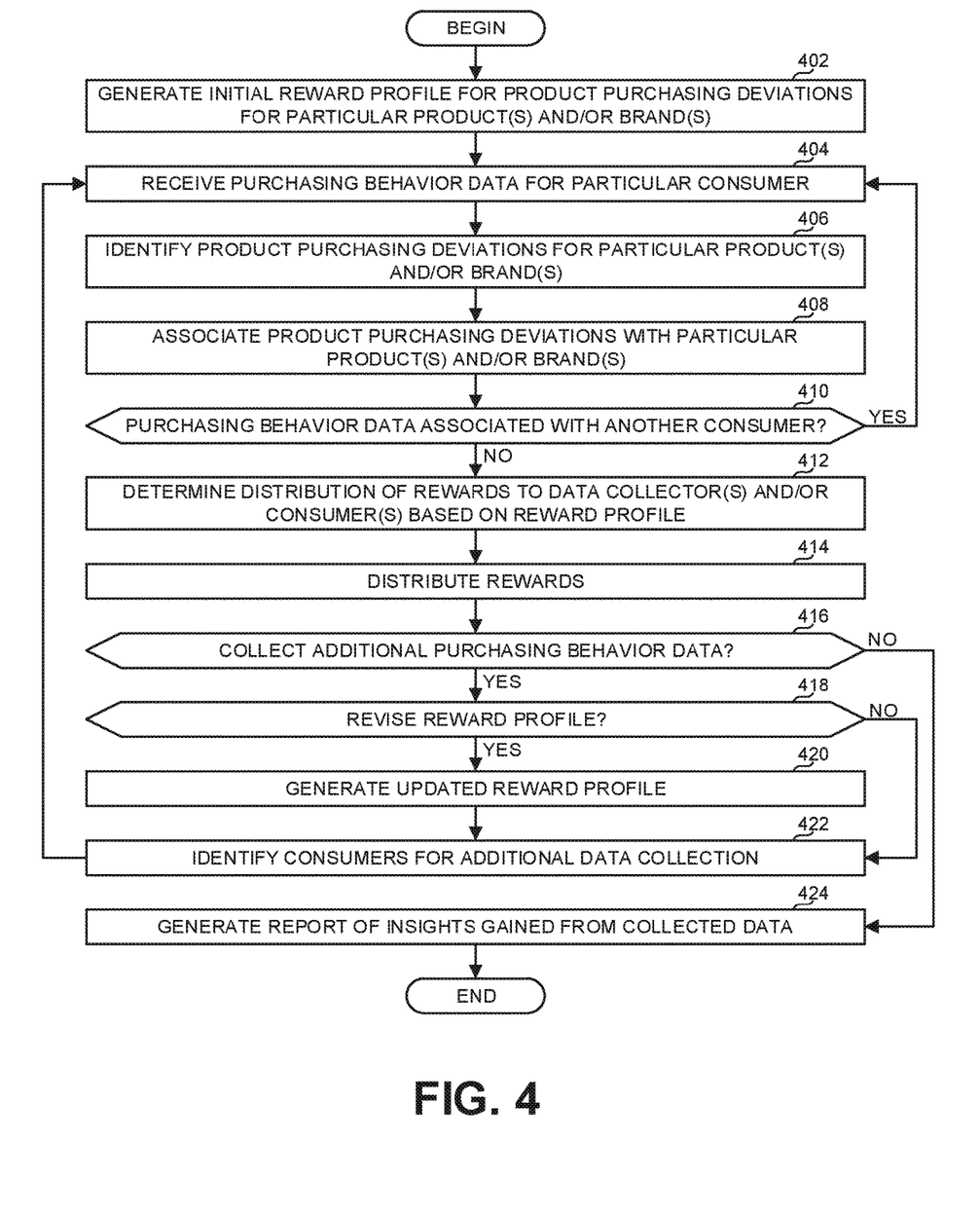

Flowcharts representative of example hardware logic, machine readable instructions, hardware implemented state machines, and/or any combination thereof for implementing the data processing server 112 of FIGS. 1 and/or 2 are shown in FIGS. 3 and 4. The machine readable instructions may be one or more executable programs or portion(s) of an executable program for execution by a computer processor such as the processor 512 shown in the example processor platform 500 discussed below in connection with FIG. 5. The program(s) may be embodied in software stored on a non-transitory computer readable storage medium such as a CD-ROM, a floppy disk, a hard drive, a DVD, a Blu-ray disk, or a memory associated with the processor 512, but the entire program(s) and/or parts thereof could alternatively be executed by a device other than the processor 512 and/or embodied in firmware or dedicated hardware. Further, although the example program(s) are described with reference to the flowcharts illustrated in FIGS. 3 and 4, many other methods of implementing the example data processing server 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 3 and 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Turning in detail to the flowcharts, FIG. 3 is representative of example machine readable instructions that may be executed to implement the example data processing server of FIGS. 1 and/or 2 to track stock statuses of products and to reward the collection of data regarding the same. The program of FIG. 3 begins at block 302 where the example reward profile analyzer 212 generates an initial reward profile for stock status data for particular product(s). In some examples, the initial reward profile is a default reward profile that defines rewards that are evenly distributed across all types of stock statuses. For example, the reward profile may define 50 points for an out-of-stock status, 50 points for an intermediate (e.g., 50%) stocked status, and 50 points for a fully stocked status, for a total of 150 points. In some examples, the initial reward profile may define greater rewards for some types of stock status over others. Defining a reward profile that is uneven may be appropriate when particular types of stock statuses are known upfront to be particularly relevant and/or important to the purpose of the research study. In some examples, block 302 may be omitted with the reward profile being generated after the collection of data.

At block 304, the example communications interface 202 receives stock status data for the particular product(s) at a particular retail establishment 104. In some examples, the particular retail establishment 104 is identified in advance by the market data analyzer 208. In some such examples, the communications interface 202 may transmit instructions to a data collector 106 to visit the identified retail establishment 104 to collect and report the stock status data. In some examples, the particular retail establishment 104 may be determined independently by a data collector 106. For instance, in examples, where the data collectors 106 are consumers, the data collector 106 may individual decide to observe and report on the stock status of product(s) at the retail establishment(s) 104 that the data collector 106 visits as an ordinary consumer.

At block 306, the example stock status data analyzer 204 determines the stock status of the particular product(s). That is, the example stock status data analyzer 204 categorizes or labels the data to one of the stock statuses defined in the reward profile (e.g., an out-of-stock status, an intermediate stock status, or a fully stocked status, etc.). In some examples, the data collector 106 may define the stock status directly such that the example stock status data analyzer 204 does not need to perform any calculations to make the determination. In other examples, the stock status data reported from a data collector 106 may indicate the amount (e.g., number of items) of the product(s), which the example stock status data analyzer 204 then compares to the capacity of the allotted space for the product(s) in the particular retail establishment 104 that may be previously stored in a database.

At block 308, the example stock status data analyzer 204 associates the stock status with the particular retail establishment. At block 310, the example stock status data analyzer 204 determines whether there is stock status data associated with another retail establishment 104. If so, control returns to block 304. Otherwise, control advances to block 312. At block 312, the example reward profile analyzer 212 determines the distribution of rewards to the data collector(s) 106 and/or the retail establishment(s) 104 based on the reward profile. In some examples, where the reward profile was not previously defined at block 302, block 312 includes the market data analyzer 208 analyzing the collected stock status data for insights that may be used as the basis to define the reward profile. At block 314, the example reward profile analyzer 212 distributes the rewards.

At block 316, the example market data analyzer 208 determines whether to collect additional stock status data. In some examples, additional stock status data may be sought to investigate and/or verify insights gains from the market data analyzer 208 analyzing the collected data. If additional stock status data is to be collected, control advances to block 318 where the market data analyzer 208 determines whether to revise the reward profile. In some examples, the reward profile may be revised to increase rewards for particular types of stock statuses and decrease the rewards for others consistent with the particular types of information that provides the greatest insights of particular interest in the market research study. For example, if after an analysis of the initially collected data, the market data analyzer 208 determines that further stock status data indicative of an out-of-stock status is of particular importance, the market data analyzer 208 may determine that a higher reward should be given for the reporting of out-of-stock statuses when the additional stock status data is collected. Accordingly, at block 320, the example reward profile analyzer generates an updated reward profile. For example, the new reward profile may define 140 points for an out-of-stock status, 5 points for an intermediate (e.g., 50%) stocked status, and 5 points for a fully stocked status, for a total of 150 points. At block 322, the example market data analyzer 208 identifies retail establishments 104 for the additional data collection. In some examples, the identified retail establishments 104 may be the same retail establishments used in connection with the initial data collection. In some examples, the identified retail establishments 104 may be different than those used in connection with the initial data collection. In some examples, the identified retail establishments 104 may be randomly selected from a pool of retail establishments such that at least some of the identified retail establishments 104 may be the same as for the initial data collection. Thereafter, control returns to block 304 to repeat the process.

Returning to block 318, if the market data analyzer 208 determines not to revise the reward profile, control advances directly to block 322. Returning to block 316, if the market data analyzer 208 determines not to collect additional stock status data, control advances to block 324. At block 324, the example report generator 210 generates a report of insights gained from the collected data. In some examples, the report generator 210 may generate a report after each phase of data collection even if the example market data analyzer 208 determines to collect additional data (at block 316). After the final report is generated, the example process of FIG. 3 ends.

FIG. 4 is a flowchart representative of example machine readable instructions that may be executed to implement the example data processing server of FIGS. 1 and/or 2 to track product purchasing deviations and to reward the collection of data regarding the same. That is, whereas the flowchart of FIG. 3 is focused on tracking stock status data, the flowchart of FIG. 4 is focused on the tracking of purchasing behavior to identify when a consumer deviates from the products/ brands the consumer normally purchases as a product/brand loyal consumer. In some examples, such deviations may be used to infer that the product/brand the consumer usually buys was unavailable at the time of purchase.

The program of FIG. 4 begins at block 402 where the example reward profile analyzer 212 generates an initial reward profile for product purchasing deviations for particular product(s) and/or brand(s). For example, an initial reward profile may define 50 points for a product/brand loyal purchase (e.g., a purchase of a product/brand that is regularly purchased) and 50 points for a product purchasing deviation (e.g., a purchase that switches to an alternate product/brand from what is regularly purchased), for a total of 100 points.

At block 404, the example communications interface 202 receives purchasing behavior data for a particular consumer (which may or may not also be the data collector 106 providing the data). In some examples, the consumer is a panelists enrolled in a panel maintained by the market research entity 108. At block 406, the example purchasing behavior data analyzer 206 identifies product purchasing deviations for the particular product(s) and/or brand(s). At block 408, the example purchasing behavior data analyzer 206 associates the product purchasing deviations with the particular product(s) and/or brand(s). At block 410, the example purchasing behavior data analyzer 206 determines whether there is purchasing behavior data associated with another consumer. If so, control returns to block 404. Otherwise, control advances to block 412. At block 412, the example reward profile analyzer 212 determines the distribution of rewards to the data collector(s) 106 and/or the consumer(s) (which may correspond to the data collectors 106) based on the reward profile. At block 414, the example reward profile analyzer 212 distributes the rewards.

At block 416, the example market data analyzer 208 determines whether to collect additional purchasing behavior data. If so, control advances to block 418 where the market data analyzer 208 determines whether to revise the reward profile. If so, control advances to block 420 where the example reward profile analyzer generates an updated reward profile. For example, if product purchasing deviations are determined to be of particular interest to the research study, the new reward profile may define 5 points for a product/brand loyal purchase and 95 points for a product purchasing deviation, for a total of 100 points. At block 422, the example market data analyzer 208 identifies consumers for the additional data collection. In some examples, the identified consumers may be the same consumers used in connection with the initial data collection. In some examples, the consumers may be different than those used in connection with the initial data collection. In some examples, the identified consumers may be randomly selected from a pool of consumers such that at least some of the identified consumers may be the same as for the initial data collection. Thereafter, control returns to block 404 to repeat the process.

Returning to block 418, if the market data analyzer 208 determines not to revise the reward profile, control advances directly to block 422. Returning to block 416, if the market data analyzer 208 determines not to collect additional purchasing behavior data, control advances to block 424. At block 424, the example report generator 210 generates a report of insights gained from the collected data. In some examples, the report generator 210 may generate a report after each phase of data collection even if the example market data analyzer 208 determines to collect additional data (at block 416). After the final report is generated, the example process of FIG. 4 ends.

Figure 5:
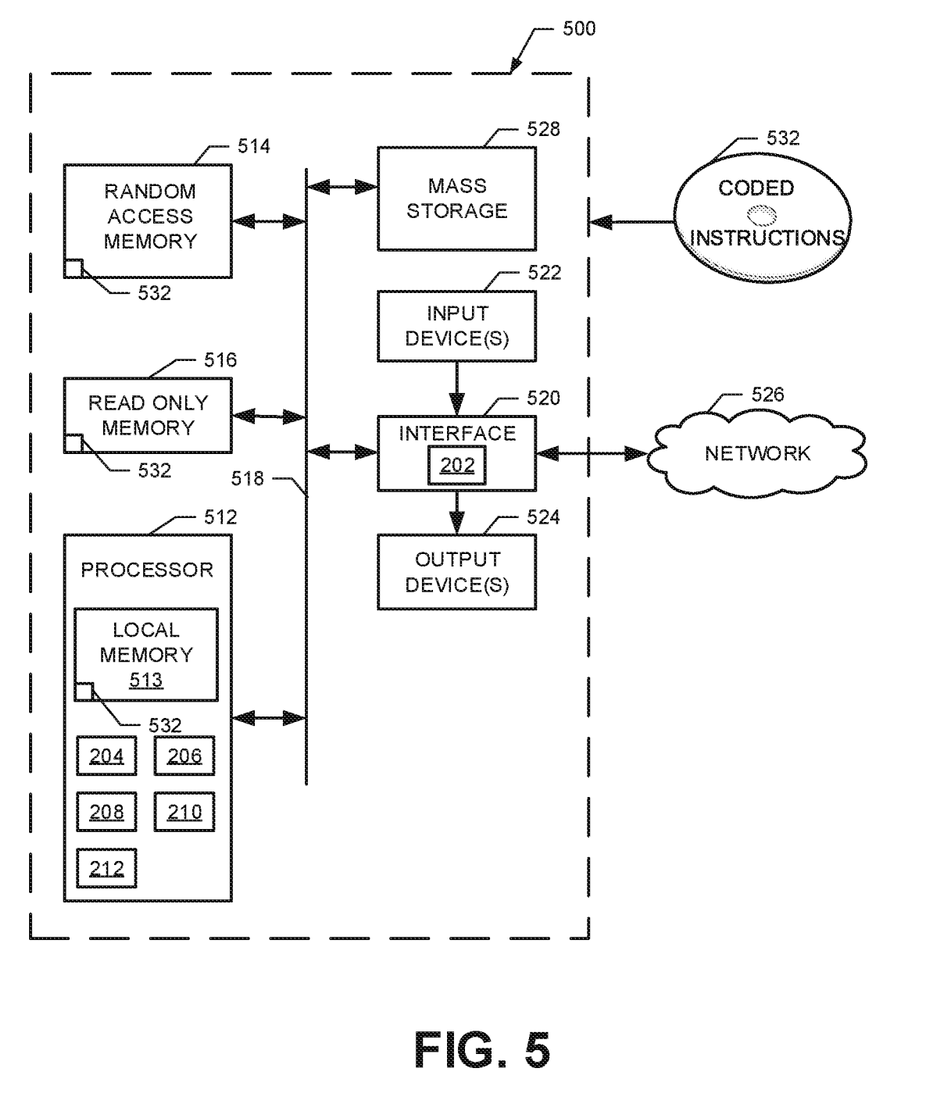
FIG. 5 is a block diagram of an example processor platform structured to execute the example machine readable instructions of FIGS. 3 and/or 4 to implement the example data processing server of FIGS. 1 and/or 2.

FIG. 5 is a block diagram of an example processor platform 500 structured to execute the instructions of FIGS. 3 and/or 4 to implement the data processing server 112 of FIGS. 1 and/or 2. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example stock status data analyzer 204, the example purchasing behavior data analyzer 206, the example market data analyzer 208, the example report generator 210, and the example reward profile analyzer 212

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

The machine executable instructions 532 of FIGS. 3 and/or 4 may be stored in the mass storage device 528, in the volatile memory 514, in the non-volatile memory 516, and/or on a removable non-transitory computer readable storage medium such as a CD or DVD.

From the foregoing, it will be appreciated that example methods, apparatus and articles of manufacture have been disclosed that enable a central data processing server to aggregate market data (e.g., stock status data and/or purchasing behavior data) from multiple data collectors reporting such data from multiple geographically dispersed retail establishments for analysis to gain insights about the availability of products for purchase in particular markets. The number of data collectors reporting such data and/or the number of retail establishments with which such data is associated can result in massive amounts of data that need to be processed and/or analyzed in relatively short time to provide reliable and up to data market statistics. Examples disclosed herein improve this technologically rigorous process by defining a reward profile that is tailored to facilitate and/or incentivize the collection and reporting of particular types of data. Furthermore, the reward profile may be updated and/or revised through multiple iterations of data collection to increase the efficiency at which relevant information is collected and/or analyzed to generate accurate and timely reports of market statistics of particular interest in market research studies.

Example methods, apparatus, systems, and articles of manufacture to monitor the availability of products for purchase are disclosed herein. Further examples and combinations thereof include the following:

Example 1 includes an apparatus, comprising a communications interface to receive market data from different data collectors, the market data including stock status data indicative of different stock statuses for a product in different retail establishments, and a reward profile analyzer reduce error in collection of the stock status data by generating a reward profile for the market data, the reward profile to define different reward levels for different types of the stock statuses indicated by the stock status data, determining a distribution of rewards among the different data collectors based on the reward profile and different portions of the market data provided by corresponding ones of the different data collectors, and providing the rewards to the different data collectors based on the distribution.

Example 2 includes the apparatus of example 1, wherein the distribution of rewards is a first distribution of first rewards, the reward profile analyzer to determine a second distribution of second rewards among the retail establishments based on the reward profile.

Example 3 includes the apparatus of example 1, wherein the market data is first market data and the rewards are first rewards, the apparatus further including a market data analyzer to determine to obtain additional market data corresponding to the product in additional retail establishments based on an analysis of the first market data, the reward profile analyzer to update the reward profile based on the analysis of the first market data, and distribute additional rewards for the additional market data based on the updated reward profile.

Example 4 includes the apparatus of example 1, wherein the different stock statuses include an out-of-stock status, a partially stocked status, and a fully stocked status.

Example 5 includes the apparatus of example 4, wherein the reward profile is to define a first reward level for the out-of-stock status, a second reward level for the partially stocked status, and a third reward level for the fully stocked status, the first reward level to be greater than either the second or third reward levels.

Example 6 includes the apparatus of example 4, wherein the reward profile is to define a first reward level for the out-of-stock status, a second reward level for the partially stocked status, and a third reward level for a fully stocked status, the third reward level to be greater than either the first or second reward levels.

Example 7 includes the apparatus of example 1, wherein a first type of the stock statuses of greatest interest to a provider of the product corresponds to a greatest reward level defined in the reward profile.

Example 8 includes the apparatus of example 1, wherein the reward profile is a first reward profile, the market data to include purchasing behavior data indicative of a purchase of the product by a consumer, the reward profile analyzer to generate a second reward profile for the market data, the reward profile to define different reward levels for different types of purchases indicated by the purchasing behavior data, the different types of purchases including a product/brand loyal purchase and a deviation from a product/brand loyal purchase.

Example 9 includes the apparatus of example 8, wherein the second reward profile is to define a first reward level for the product/brand loyal purchase and a second reward level for the deviation from the product/brand loyal purchase, the first reward level to be less than the second reward level.

Example 10 includes a non-transitory computer readable medium comprising instructions that, when executed, cause a machine to at least obtain market data from different data collectors, the market data including stock status data indicative of different stock statuses for a product in different retail establishments, generate a reward profile for the market data, the reward profile to define different reward levels for different types of the stock statuses indicated by the stock status data, determine a distribution of rewards among the different data collectors based on the reward profile and different portions of the market data provided by corresponding ones of the different data collectors, and provide the rewards to the different data collectors based on the distribution.

Example 11 includes the non-transitory computer readable medium of example 10, wherein the distribution of rewards is a first distribution of first rewards, the instructions to further cause the machine to determine a second distribution of second rewards among the retail establishments based on the reward profile.

Example 12 includes the non-transitory computer readable medium of example 10, wherein the market data is first market data and the rewards are first rewards, the instructions to further cause the machine to determine to obtain additional market data corresponding to the product in additional retail establishments based on an analysis of the first market data, update the reward profile based on the analysis of the first market data, and distribute additional rewards for the additional market data based on the updated reward profile.

Example 13 includes the non-transitory computer readable medium of example 10, wherein the different stock statuses include an out-of-stock status, a partially stocked status, and a fully stocked status.

Example 14 includes the non-transitory computer readable medium of example 13, wherein the reward profile is to define a first reward level for the out-of-stock status, a second reward level for the partially stocked status, and a third reward level for the fully stocked status, the first reward level to be greater than either the second or third reward levels.

Example 15 includes the non-transitory computer readable medium of example 13, wherein the reward profile is to define a first reward level for the out-of-stock status, a second reward level for the partially stocked status, and a third reward level for a fully stocked status, the third reward level to be greater than either the first or second reward levels.

Example 16 includes the non-transitory computer readable medium of example 10, wherein a first type of the stock statuses of greatest interest to a provider of the product corresponds to a greatest reward level defined in the reward profile.

Example 17 includes the non-transitory computer readable medium of example 10, wherein the reward profile is a first reward profile, the market data to include purchasing behavior data indicative of a purchase of the product by a consumer, the instructions to further cause the machine to generate a second reward profile for the market data, the reward profile to define different reward levels for different types of purchases indicated by the purchasing behavior data, the different types of purchases including a product/brand loyal purchase and a deviation from a product/brand loyal purchase.

Example 18 includes the non-transitory computer readable medium of example 17, wherein the second reward profile is to define a first reward level for the product/brand loyal purchase and a second reward level for the deviation from the product/brand loyal purchase, the first reward level to be less than the second reward level.

Example 19 includes a method, comprising obtaining market data from different data collectors, the market data including stock status data indicative of different stock statuses for a product in different retail establishments, generating a reward profile for the market data, the reward profile to define different reward levels for different types of the stock statuses indicated by the stock status data, determining a distribution of rewards among the different data collectors based on the reward profile and different portions of the market data provided by corresponding ones of the different data collectors, and providing the rewards to the different data collectors based on the distribution.

Example 20 includes the method of example 19, wherein the distribution of rewards is a first distribution of first rewards, the method further including determining a second distribution of second rewards among the retail establishments based on the reward profile.

Example 21 includes the method of example 19, wherein the market data is first market data and the rewards are first rewards, the method further including determining to obtain additional market data corresponding to the product in additional retail establishments based on an analysis of the first market data, updating the reward profile based on the analysis of the first market data, and distributing additional rewards for the additional market data based on the updated reward profile.

Example 22 includes the method of example 19, wherein the different stock statuses include an out-of-stock status, a partially stocked status, and a fully stocked status.

Example 23 includes the method of example 22, wherein the reward profile is to define a first reward level for the out-of-stock status, a second reward level for the partially stocked status, and a third reward level for the fully stocked status, the first reward level to be greater than either the second or third reward levels.

Example 24 includes the method of example 22, wherein the reward profile is to define a first reward level for the out-of-stock status, a second reward level for the partially stocked status, and a third reward level for a fully stocked status, the third reward level to be greater than either the first or second reward levels.

Example 25 includes the method of example 19, wherein a first type of the stock statuses of greatest interest to a provider of the product corresponds to a greatest reward level defined in the reward profile.

Example 26 includes the method of example 19, wherein the reward profile is a first reward profile, the market data to include purchasing behavior data indicative of a purchase of the product by a consumer, the method further including generating a second reward profile for the market data, the reward profile to define different reward levels for different types of purchases indicated by the purchasing behavior data, the different types of purchases including a product/brand loyal purchase and a deviation from a product/brand loyal purchase.

Example 27 includes the method of example 26, wherein the second reward profile is to define a first reward level for the product/brand loyal purchase and a second reward level for the deviation from the product/brand loyal purchase, the first reward level to be less than the second reward level.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus, comprising:
a purchasing behavior data analyzer to:
   track consumer purchasing behavior corresponding to a product;
   identify a deviation trend corresponding to the consumer purchasing behavior; and
   associate the product with the deviation trend;
a communications interface to receive market data from different data collectors via network communications from reporting devices associated with the different data collectors, the market data including stock status data indicative of different stock statuses for the product in different retail establishments, the purchasing behavior data analyzer to, in response to the deviation trend, verify whether respective ones of the different stock statuses for the product caused the deviation trend; and
a reward profile analyzer to further investigate the deviation by causing collection of additional stock status data by:
   generating a reward profile for the market data corresponding to the product, the reward profile to define different reward levels for different types of the different stock statuses indicated by the stock status data;
   determining a distribution of reward information to be transmitted to the reporting devices corresponding to the different data collectors based on the reward profile; and
   providing the reward information to the reporting devices corresponding to the different data collectors based on the distribution and the verification.

2. The apparatus of claim 1, wherein the distribution of the reward information is a first distribution of first rewards, the reward profile analyzer to determine a second distribution of second reward information among the retail establishments based on the reward profile.

3. The apparatus of claim 1, wherein the market data is first market data and the reward information includes first rewards, the apparatus further including a market data analyzer to determine, based on an analysis of the first market data, to obtain additional market data corresponding to the product in additional retail establishments, the reward profile analyzer to:
   update the reward profile based on the analysis of the first market data; and
   distribute additional reward information for the additional market data based on the updated reward profile.

4. The apparatus of claim 1, wherein the different stock statuses include an out-of-stock status, a partially stocked status, and a fully stocked status.

5. The apparatus of claim 4, wherein the reward profile is to define a first reward level for the out-of-stock status, a second reward level for the partially stocked status, and a third reward level for the fully stocked status, the first reward level to be greater than either the second or third reward levels.

6. The apparatus of claim 4, wherein the reward profile is to define a first reward level for the out-of-stock status, a second reward level for the partially stocked status, and a third reward level for a fully stocked status, the third reward level to be greater than either the first or second reward levels.

7. The apparatus of claim 1, wherein a first type of the stock statuses identified by a provider of the product as being of greatest interest to the provider corresponds to a greatest reward level defined in the reward profile.

8. The apparatus of claim 1, wherein the reward profile is a first reward profile, the market data to include purchasing behavior data indicative of a purchase of the product by a consumer, the reward profile analyzer to generate a second reward profile for the market data, the reward profile to define different reward levels for different types of purchases indicated by the purchasing behavior data, the different types of purchases including a product/brand loyal purchase and a deviation from a product/brand loyal purchase.

9. The apparatus of claim 8, wherein the second reward profile is to define a first reward level for the product/brand loyal purchase and a second reward level for the deviation from the product/brand loyal purchase, the first reward level to be less than the second reward level.

10. A non-transitory computer readable medium comprising instructions that, when executed, cause a machine to at least:
  track consumer purchasing behavior corresponding to a product;
  identify a deviation trend corresponding to the consumer purchasing behavior;
  associate the product with the deviation trend;
  obtain market data from different data collectors via network communications from reporting devices associated with the different data collectors, the market data including stock status data indicative of different stock statuses for the product in different retail establishments;
  in response to the deviation trend, verify whether respective ones of the different stock statuses for the product caused the deviation trend;
  investigate the deviation by causing collection of additional stock status data;
  generate a reward profile for the market data corresponding to the product, the reward profile to define different reward levels for different types of the different stock statuses indicated by the stock status data;
  determine a distribution of reward information to be transmitted to the reporting devices corresponding to the different data collectors based on the reward profile; and
  provide the reward information to the reporting devices corresponding to the different data collectors based on the distribution and the verification.

11. The non-transitory computer readable medium of claim 10, wherein the distribution of the reward information is a first distribution of first rewards, the instructions to further cause the machine to determine a second distribution of second rewards among the retail establishments based on the reward profile.

12. The non-transitory computer readable medium of claim 10, wherein the market data is first market data and the reward information includes first rewards, the instructions to further cause the machine to:
  determine, based on an analysis of the first market data, to obtain additional market data corresponding to the product in additional retail establishments;
  update the reward profile based on the analysis of the first market data; and
  distribute additional reward information for the additional market data based on the updated reward profile.

13. The non-transitory computer readable medium of claim 10, wherein the different stock statuses include an out-of-stock status, a partially stocked status, and a fully stocked status.

14. The non-transitory computer readable medium of claim 13, wherein the reward profile is to define a first reward level for the out-of-stock status, a second reward level for the partially stocked status, and a third reward level for the fully stocked status, the first reward level to be greater than either the second or third reward levels.

15. The non-transitory computer readable medium of claim 13, wherein the reward profile is to define a first reward level for the out-of-stock status, a second reward level for the partially stocked status, and a third reward level for a fully stocked status, the third reward level to be greater than either the first or second reward levels.

16. The non-transitory computer readable medium of claim 10, wherein a first type of the stock statuses identified by a provider of the product as being of greatest interest to the provider corresponds to a greatest reward level defined in the reward profile.

17. The non-transitory computer readable medium of claim 10, wherein the reward profile is a first reward profile, the market data to include purchasing behavior data indicative of a purchase of the product by a consumer, the instructions to further cause the machine to generate a second reward profile for the market data, the reward profile to define different reward levels for different types of purchases indicated by the purchasing behavior data, the different types of purchases including a product/brand loyal purchase and a deviation from a product/brand loyal purchase.

18. The non-transitory computer readable medium of claim 17, wherein the second reward profile is to define a first reward level for the product/brand loyal purchase and a second reward level for the deviation from the product/brand loyal purchase, the first reward level to be less than the second reward level.

19. A method, comprising:
  tracking, by executing an instruction on at least one processor, consumer purchasing behavior corresponding to a product;
  identifying, by executing an instruction on the at least one processor, a deviation trend corresponding to the consumer purchasing behavior;
  associating, by executing an instruction on the at least one processor, the product with the deviation trend;
  obtaining market data from different data collectors via network communications from reporting devices associated with the different data collectors, the market data including stock status data indicative of different stock statuses for the product in different retail establishments, in response to the deviation trend, verify whether respective ones of the different stock statuses for the product caused the deviation trend;
  investigating, by executing an instruction on the at least one processor, the deviation by causing collection of additional stock status data;
  generating, by executing an instruction on the at least one processor, a reward profile for the market data corresponding to the product, the reward profile to define different reward levels for different types of the stock statuses indicated by the stock status data;
  determining, by executing an instruction on the at least one processor, a distribution of reward information to be transmitted to the reporting devices corresponding to the different data collectors based on the reward profile; and providing, by executing an instruction on the at least one processor, the reward information to the reporting devices corresponding to the different data collectors based on the distribution and the verification.

20. The method of claim 19, wherein the distribution of the reward information is a first distribution of first rewards, the method further including determining a second distribution of second rewards among the retail establishments based on the reward profile.

* * * * *